Sept. 24, 1963     R. T. GOULET ETAL     3,104,966
AIR FILTERS

Filed June 27, 1960                            2 Sheets-Sheet 1

*INVENTORS*
ROGER T. GOULET
HUGH E. PRITCHARD
BY

ATTORNEY

INVENTORS
ROGER T. GOULET
HUGH E. PRITCHARD
BY Charles E. Willson
ATTORNEY 3,104,966
AIR FILTERS
Roger T. Goulet, Pinckney, and Hugh E. Pritchard, Detroit, Mich., assignors to Fram Corporation, Providence, R.I., a corporation of Rhode Island
Filed June 27, 1960, Ser. No. 38,913
1 Claim. (Cl. 55—510)

This invention relates to air filters for filtering the air supplied to an engine carburetor, or to the crankcase of an internal combustion engine, or for filtering air for other purposes.

It is now common practice to filter the air supplied to an engine carburetor and crankcase, as the automobile industry is now largely aware of the importance of removing dirt from the air that enters the carburetor and crankcase of an engine.

The present invention provides a simple and inexpensive construction of few parts for removably mounting an air filter on a "breather tube" such as the oil fill pipe of a crankcase, or the air supply pipe to an engine carburetor, or the vent pipe for a tank or air compressor.

All such equipment is frequently provided with an air inlet pipe herein referred to as a breather tube, and the present invention contemplates a base plate adapted to be permanently secured to such tube, a filter housing removably secured to this base plate, and a filter cartridge removably retained in the housing.

One important feature of the present invention resides in a filter cartridge having a yielding plastic end cap at each end thereof and a central opening in each cap, and in the construction of the filter cover or housing whereby it is provided with an inwardly extending annular boss adapted to frictionally enter the opening in the upper end cap to removably retain the cartridge within the cover.

Another important feature resides in a filter cover having the shape of an inverted cup to house the filter cartridge, and in an annular base plate secured to the breather tube, and particularly in the skirt of such cover which is provided with oppositely disposed latches that snap into locking engagement with the periphery of the base plate. The skirt which is flexible has two such latches disposed 180° apart, and when it is desired to remove the cover and cartridge from said tube, all that is necessary is to distort the skirt momentarily from its normal round position to release such latches.

As a result of the construction of the present invention, the air filter cartridge is frictionally retained in the protecting cover or housing, and this cover is removably secured to said tube by a snap-on action that firmly secures the cover in place. This cover can be easily released from the base plate by pressing on the cover skirt, as above stated, at two opposite points.

The air filter of the present invention may be used on various devices having an air breather tube, but it is particularly well adapted for use to filter the air supplied to the carburetor of small engines, such as used on power lawn mowers, and on the oil fill pipe of the crankcase of motor vehicles. It is hereinafter described as applied to such oil fill pipe.

The above and other features of the present invention will be further understood from the following description when read in connection with the accompanying drawings, wherein.

Figure 3:
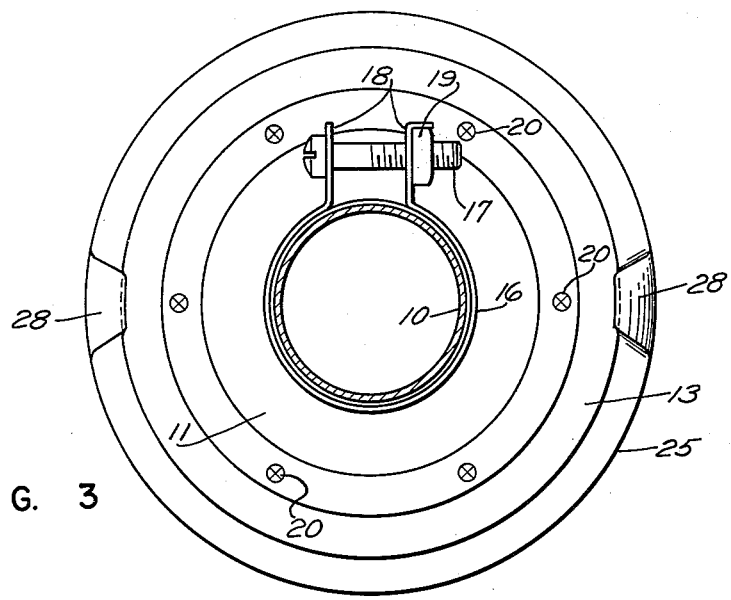
FIG. 3 is a bottom view of the construction shown in FIG. 1, the oil fill pipe or breather pipe being shown in section.
Figure 4:
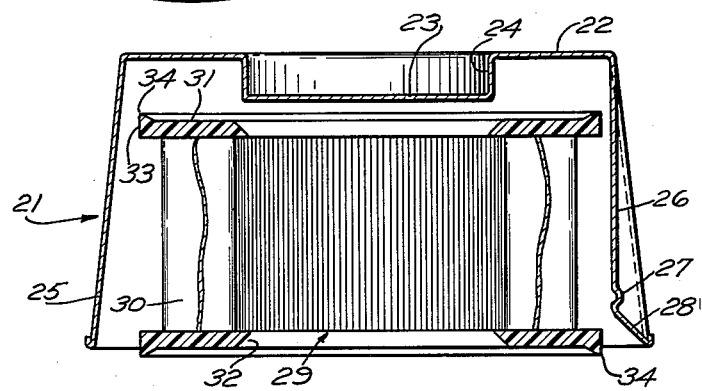
FIG. 4 is a vertical sectional view through the cover and air filter cartridge, the latter being shown in spaced relation to the position in which it is normally frictionally attached to the cover.
Figure 5:
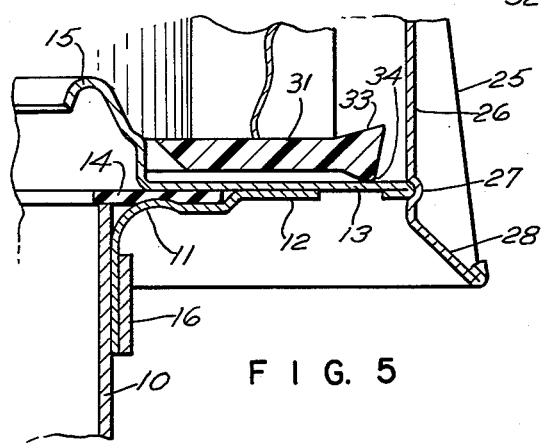
FIG. 5 on a larger scale is a vertical sectional view through the lower portion of parts shown in FIG. 1.

Referring to the embodiment of the invention shown in the drawings, the numeral 10 designates an oil fill pipe of usual construction and which is attached to the crankcase of an internal combustion engine, so that oil may be added to the crankcase from time to time. To the upper end of this fill pipe 10 is secured the sleeve 11 which is of proper size to embrace the outer surface of such pipe and this sleeve has the outwardly extending flange 12 that is spot welded at a number of points to an annular base plate 13. A flat annular gasket 14 is confined between the upper face of the flange 12 and base plate 13 as shown in FIG. 5 and this gasket is adapted to sealingly engage the upper end of the fill pipe 10. The base plate 13 preferably has its outer edge folded under as shown, and has the annular upwardly extending sleeve or guard 15 that has a central opening through which oil is introduced into the fill pipe 10 and crankcase. This guard helps to protect the gasket 14 from oil being poured into the fill pipe. The sleeve 11 is tightly secured to the upper end portion of the pipe 10 by the clamping ring 16 which is tightened about the sleeve 11 by the bolt 17 shown in FIG. 3 as extending through the ears 18 of the ring and this bolt is provided with a nut 19. The numeral 20 designates the spots at which the flange 12 is spot welded to the base plate 13.

Figure 1:
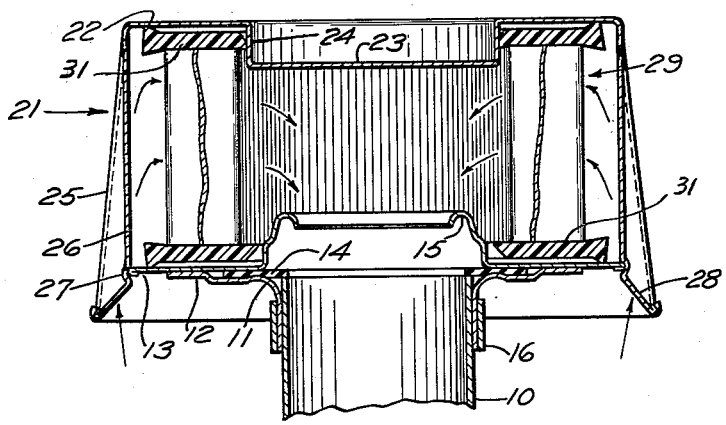
FIG. 1 is a central section through an air filter embodying the construction of the present invention.

The numeral 21 designates a cover or housing preferably formed of sheet metal and having the general shape of an inverted cup. This inverted cover has the flat bottom 22 which is provided with the inwardly extending annular boss 23 having the annular wall 24 for a purpose to be described. The cover 21 has an outwardly flaring skirt 25 which is deflected inwardly as indicated at 26 at two points disposed 180° apart. These inwardly deflected portions 26 are provided with the rounded notch portion 27 and the downwardly and outwardly flaring flange 28. The arrangement is such that the parts 26, 27, 28 engage the rounded outer edge of the base plate 13 with a snap-on action that will be apparent from FIGS. 1 and 5.

The cup shaped inverted cover or housing 21 is adapted to house and protect an annular filter cartridge 29 preferably formed of pleated paper as indicated by 30, and at each end of this pleated paper filter is secured an end cap 31 preferably formed of a yielding plastic, such as plastisol. Both end caps may have the same construction so that either end may be inserted first in the housing, and each end has a central opening of a size to snugly embrace the annular wall 24 of the inwardly extending boss 23. This central opening of each end cap 31 preferably has the inclined annular wall 32 to facilitate the ready engagement of the boss with this central opening, and to frictionally attach the cartridge to the cover so that when the cover is removed from the fill pipe 10 the cartridge will be removed with the cover and be protected thereby. However, when the cartridge becomes plugged with dirt and should be replaced with a new cartridge, it can be easily pulled free of the boss 23 to which it is frictionally attached.

The construction of the cover 21 is such that it may be easily engaged with the base plate 13 due to the latch construction indicated by 26, 27, 28. All that is necessary to secure the cover to the base plate is to force the cover downwardly against the base plate until the latch portions 27 snap into engagement with the outer periphery of the base plate 13.

Figure 2:
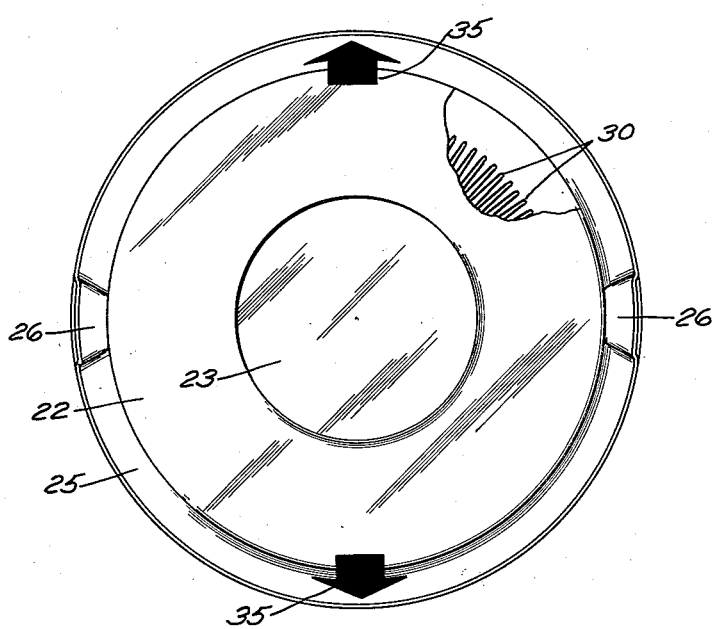
FIG. 2 is a top view of the construction shown in FIG. 1.

Each flexible end cap 31 has an outer extending periphery 33 that projects some distance beyond the pleats 30, and such flexible periphery has the sealing bead 34 adapted to seal against the base plate 13 as best shown in FIG. 5. The length of the cartridge 29 should be such that when the cover is latched to the base plate the lower end cap 31 will be held in sealing engagement with the base plate. When it is desired to release the cover 21 from the base plate, all that is necessary is to squeeze the skirt of the flexible cover at the two opposite points indicated by the arrows 35 on the upper end of the cover in FIG. 2. This serves to distort the skirt momentarily from its normally round position to release the notched portions 27 of the skirt from latching engagement with the periphery of the base plate, so that the cover and cartridge can be removed from the upper end of the oil fill pipe to permit an added quantity of oil to be supplied to the crankcase. When the cover is so removed, the cartridge is housed in and protected by the cover. This is desirable because it protects the cartridge 29 from having oil spilled thereon, and permits ready access to the upper end of the fill pipe so that oil may be easily introduced therein.

While the drawings are herein described as showing the air filter as mounted on the oil fill pipe of a crankcase, the air filter of the present invention is, as above stated, well adapted for use on various devices having a breather tube, and the claim is to be so construed.

Having thus described our invention, what we claim and desire to protect by Letters Patent is:

An air filter for the breather tube of an internal combustion engine, comprising an annular base plate adapted to be secured to said tube, an air filter cartridge comprising a cylindrical filter element having a resilient end cap at each end thereof for engagement of either cap with said plate and each cap having a circular central hole, a cover for the cartridge having the shape of an inverted cup provided with an integral bottom formed with a central inwardly projecting circular boss of a size to fit snugly and frictionally within the central hole of an end cap and thereby support the cartridge in the cover when the latter is removed from its plate-engaging position so that the cartridge is housed by the cover when the latter is removed but the cartridge can be readily removed from the cover, and said cover having a skirt provided with means for removably securing the cover to the base plate for easy removal of said cover and cartridge as a unit from the base plate.

References Cited in the file of this patent

UNITED STATES PATENTS

| | | |
|---|---|---|
| 1,036,284 | Lippke et al. | Aug. 20, 1912 |
| 2,037,884 | Day | Aug. 21, 1936 |
| 2,510,824 | Lafarge | June 6, 1950 |
| 2,675,886 | McMullen | Apr. 20, 1954 |
| 2,689,551 | Heller et al. | Sept. 21, 1954 |
| 2,939,775 | Middleton et al. | June 7, 1960 |
| 2,962,121 | Wilber | Nov. 29, 1960 |
| 2,963,111 | Rohrbacker | Dec. 6, 1960 |
| 2,979,159 | Pritchard | Apr. 11, 1961 |

FOREIGN PATENTS

| | | |
|---|---|---|
| 248,780 | Italy | June 12, 1926 |